(No Model.)
L. L. MAILLET.
COMBINED IMPLEMENT FOR REMOVING SNOW AND ICE.
No. 314,592. Patented Mar. 31, 1885.
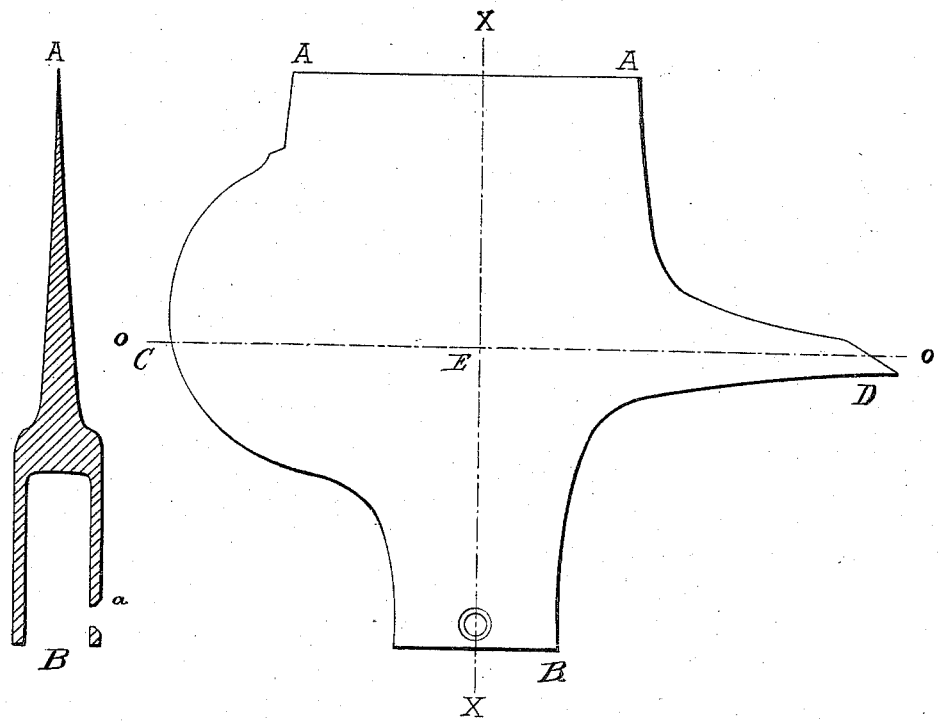
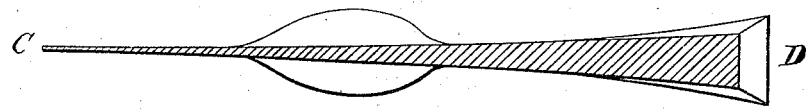
Witness
L. Lefebre
C. Hayden
L. L. Maillet
Inventor.

UNITED STATES PATENT OFFICE.

LUDGER L. MAILLET, OF MONTREAL, QUEBEC, CANADA.

COMBINED IMPLEMENT FOR REMOVING SNOW AND ICE.

SPECIFICATION forming part of Letters Patent No. 314,592, dated March 31, 1885.

Application filed April 8, 1884. (No model.)

*To all whom it may concern:*

Be it known that I, LUDGER LOUIS MAILLET, residing in the city of Montreal, Province of Quebec, Dominion of Canada, a British subject, have invented a new and useful Tool to Remove Snow and Ice from Spouts, Roofs, or Sidewalks without Using three Separate Instruments; and I hereby declare that the following is a full, clear, and exact description of the same.

My invention has reference to that class of implements in which the ax, shovel, and pick are combined and have one socket for the handle, the object being the union of those three implements into one tool.

Before the date of my application axes of various kinds have been made with one adjoined pick only; but I wish to add both an ax and a pick to a shovel of regular form, and constituting a complete instrument, which I call "The Deglaceur Maillet" or "The Snow and Ice Remover."

To understand plainly the invention, reference is made to the drawings annexed.

Figure 1 is a side view of the plain surface of the Deglaceur Maillet. Fig. 2 is a horizontal cut (sectional) on the line X X, Fig. 1. Fig. 3 is a vertical cut (sectional) from the two points O O, Fig. 1.

The shovel A, ax C, and pick D being thus combined, the implement is adapted to pick, cut, and remove ice or snow from roofs, spouts, sidewalks, or elsewhere.

The Deglaceur Maillet as it is constituted and made may be used to remove ice or snow from one point to another, and may even serve as a shovel for general use and garden work.

I therefore do not claim Letters Patent for a shovel or a pick with or without an ax; but What I do claim as my invention, and desire to secure by Letters Patent, is—

The combination, in one implement, of a shovel, A, an ax, C, and a pick, D, substantially as shown and described.

L. L. MAILLET.

Witnesses:
F. LEFETUE,
C. HAYDEN.